United States Patent [19]

Whitehead

[11] 4,430,763
[45] Feb. 14, 1984

[54] BED FRAME

[75] Inventor: Larry W. Whitehead, Lexington, N.C.

[73] Assignee: Leggett & Platt, Incorporated, Carthage, Mo.

[21] Appl. No.: 241,831

[22] Filed: Mar. 16, 1981

[51] Int. Cl.³ .............................................. A47C 19/00
[52] U.S. Cl. ........................................ 5/200 C; 5/288;
5/296; 403/252; 403/254
[58] Field of Search ................ 5/200 R, 200 C, 200 B,
5/201, 281 R, 288, 289, 290, 292, 296, 299, 304;
403/252, 253, 254

[56]  References Cited

U.S. PATENT DOCUMENTS

| | | |
|---|---|---|
| 663,934 | 12/1900 | Santmyer . |
| 1,050,066 | 1/1913 | Lund . |
| 1,094,980 | 4/1914 | Cordle ..................................... 5/296 |
| 1,439,930 | 12/1922 | Walker ..................................... 5/296 |
| 2,530,640 | 11/1950 | Wickman . |
| 2,618,000 | 11/1952 | Harris . |
| 2,947,999 | 8/1960 | Hooker . |
| 3,150,617 | 9/1964 | Phillips . |
| 3,537,114 | 11/1970 | Mis . |
| 3,760,437 | 9/1973 | Hooker ................................. 5/201 |
| 4,027,343 | 6/1977 | Hooker . |
| 4,070,718 | 1/1978 | Spitz . |
| 4,155,131 | 5/1979 | Harris et al. . |
| 4,218,789 | 8/1980 | Grassi ................................. 5/201 |
| 4,340,984 | 7/1982 | Marcyan ............................. 5/296 |

FOREIGN PATENT DOCUMENTS

| | | | |
|---|---|---|---|
| 554994 | 1/1957 | Italy ....................................... 5/288 |
| 177719 | 4/1922 | United Kingdom .................. 5/288 |

Primary Examiner—Alexander Grosz
Attorney, Agent, or Firm—Wood, Herron & Evans

[57]    ABSTRACT

A bed frame that includes a novel connector assembly for connecting a cross rail to a side rail at a corner of the bed frame that permits the frame to be easily and quickly set up and taken down, yet which provides a substantially wobble free joint, and a novel box spring retainer bracket that is connected to the frame without use of fasteners yet which is movable between use and storage positions as desired while remaining connected to the frame.

6 Claims, 8 Drawing Figures

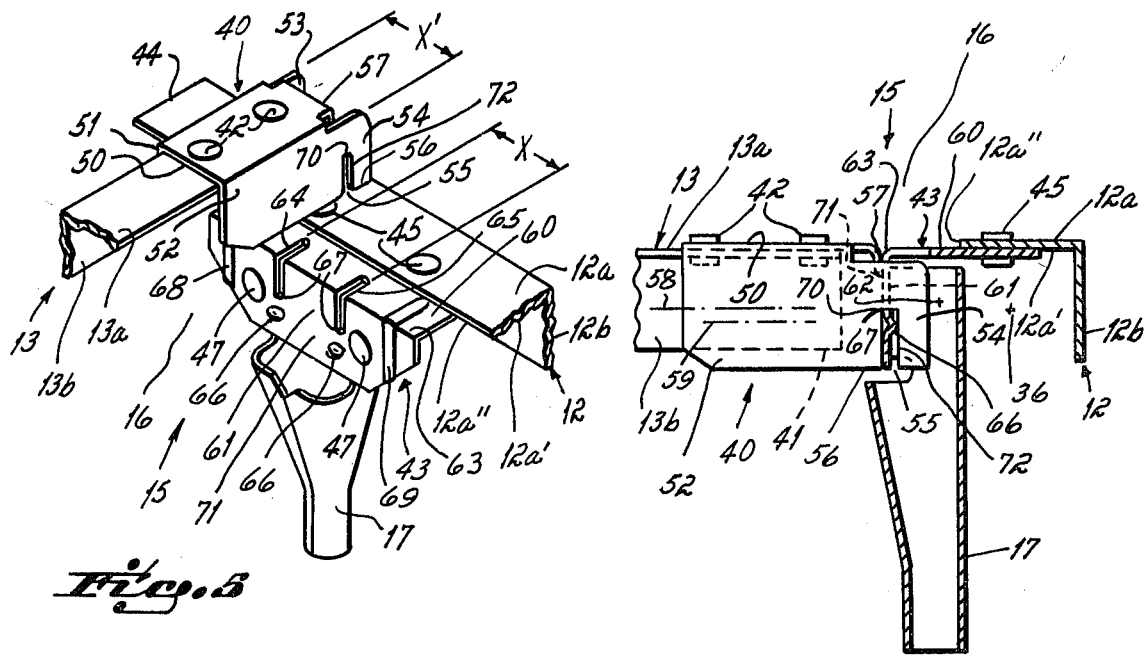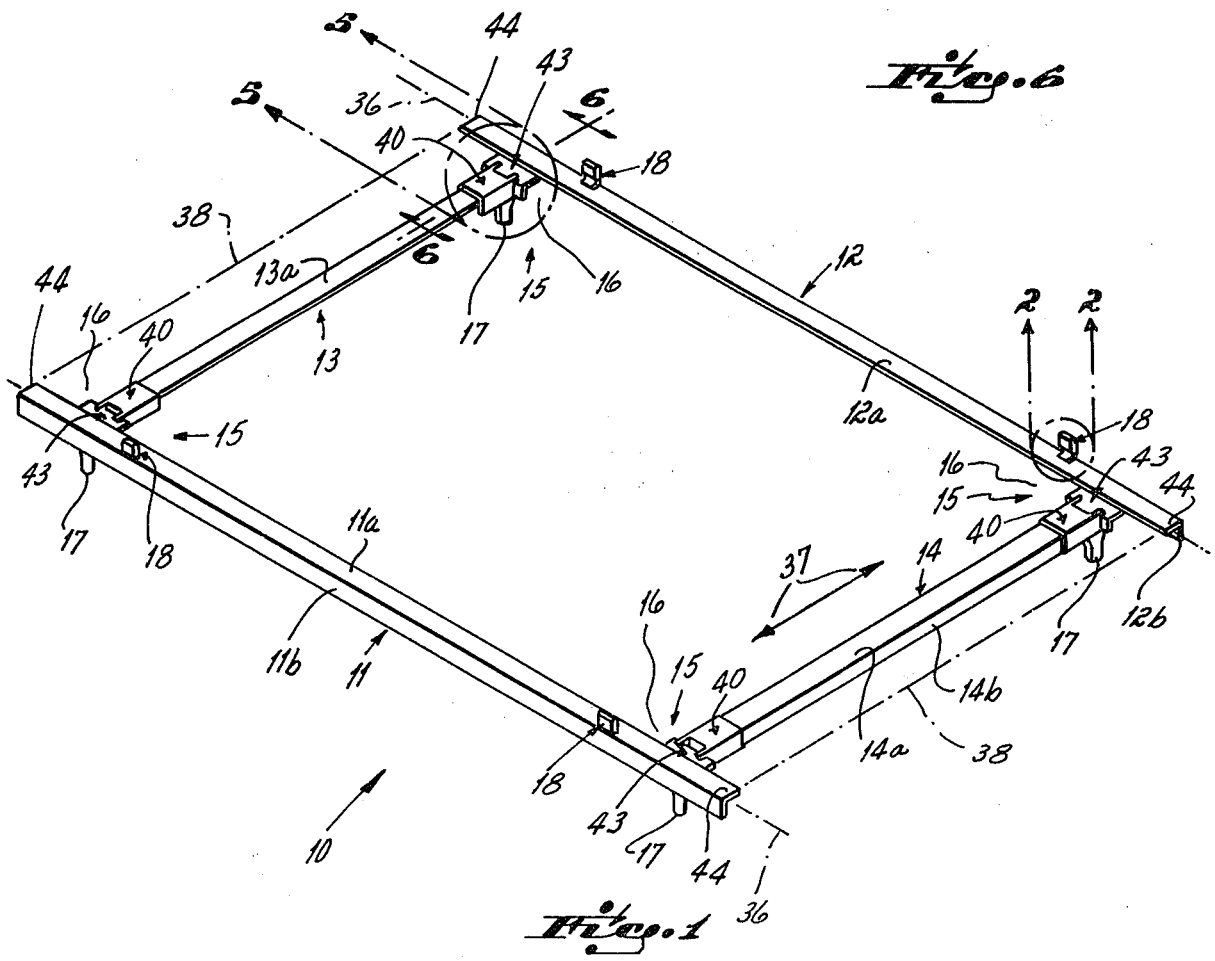

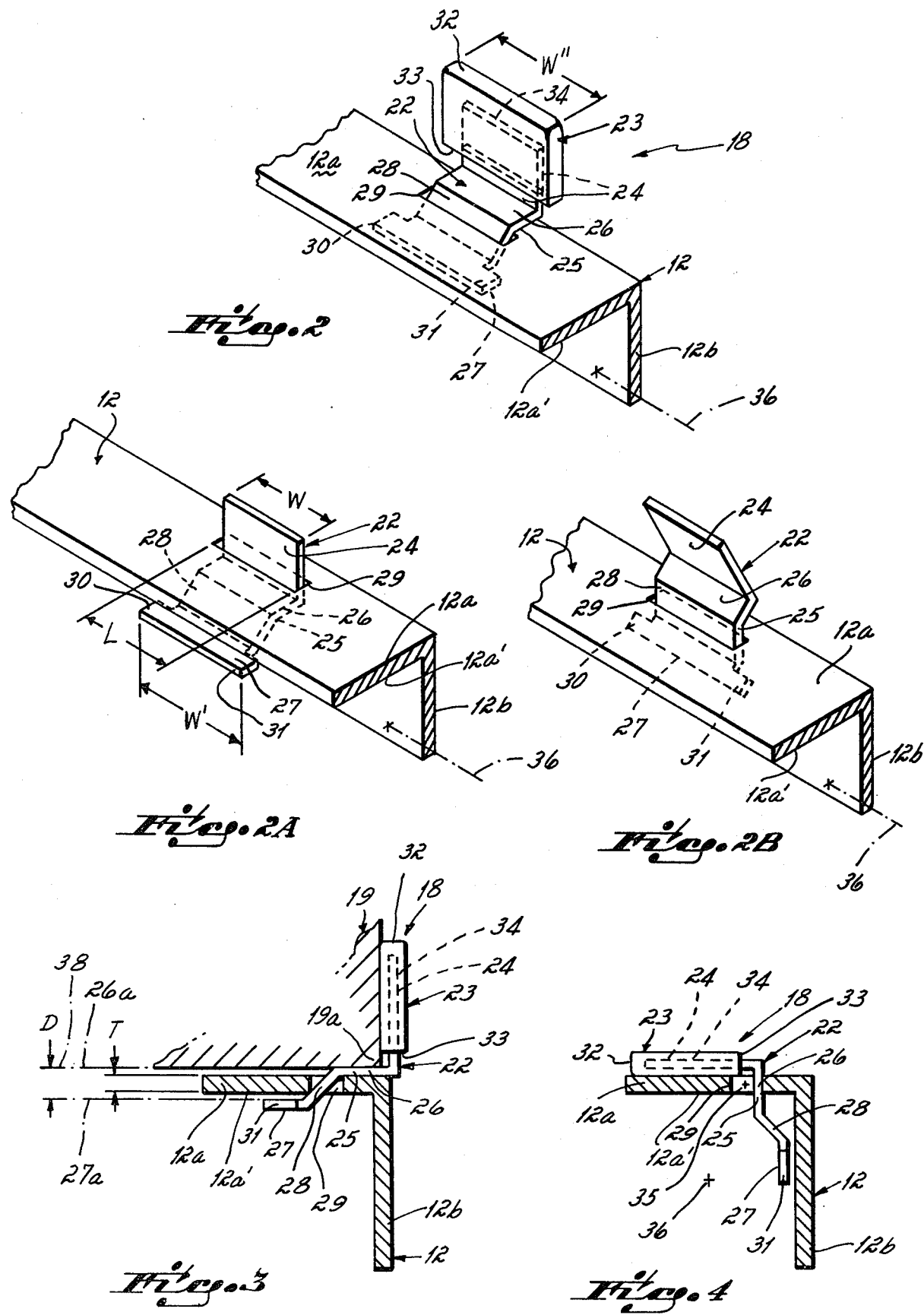

BED FRAME

This invention relates to bed frames. More particularly, this invention relates to a connector assembly for use at the corners of a bed frame, and to a box spring retainer bracket for use with the side rails of a bed frame.

Bed frames have, of course, been known for many years. The basic function of a bed frame is to provide a platform by which a bed's box spring and mattress are upraised off floor level. One particular type of bed frame which has come into common use in recent years is referred to as a Hollywood style bed frame. In this type bed frame, the frame's side rails and cross rails are commonly fabricated of angle iron, i.e., extended length metal rails having a generally right angular cross section.

In the Hollywood style bed frame, a connector assembly must be provided at each of the frame's four corners so the frame's cross rails can be interconnected with the frame's side rails to provide the final bed frame configuration. The connector assembly should be relatively easy to use upon setting up the bed frame because this type bed frame is knocked-down during shipment. In other words, the Hollywood style bed frame has both cross rails and both side rails disconnected and disposed parallel when packaged and shipped. To ship the bed frame completely assembled would require a very much larger shipping carton then is required with the frame disassembled. Various types of connector assembly structures are known to the prior art by which a bed frame's cross rails can be connected with the frame's side rails at the final set-up location. However, such prior art connector assemblies often have a significant disadvantage from the standpoint that the joint or connection so established is not completely stable. In other words, such prior art connector assemblies tend to create frame connections at the frame's corners which permit wobble or play between connected cross and side rails. This, of course, is undesirable from a consumer use standpoint.

In prior art bed frames, it is also known to connect box spring retainer brackets with the frame's side rails to prevent a box spring from sliding off the bed frame when the frame is fully assembled and in use. But if such prior art retainer brackets are immobily connected to the side rails, when it is desired to slide the box spring off the bed frame the upstanding brackets tend to catch and tear the upholstery on the box spring's underside. Retainer brackets are also known that are removable from the frame's side rails so that the brackets can be disconnected from the bed frame when it is desired to slide the mattress off the frame. But disconnectable retainer brackets easily become lost.

It has, therefore, been one objective of this invention to provide an improved bed frame having a connector assembly that permits easy and quick assembly and disassembly of a frame's cross rail with a frame's side rail at a corner of that frame, yet which provides a relatively tight connection at that joint so as to eliminate substantially any wobble between connected rails, all toward providing a rigid or tight bed frame. In accord with this objective, the connector assembly of this invention includes a cross arm bracket fixed to a cross arm and a side rail bracket fixed to a side rail. Each cross arm bracket, which preferably is formed from an inverted generally U-shaped workpiece, includes a pair of laterally spaced vertical hooks defined from opposed side walls of the workpiece. Each side rail bracket, which preferably is formed from an inverted generally L-shaped workpiece, includes a pair of laterally spaced slots formed in the vertical leg of the workpiece. The cross arm bracket also includes a locking lip positioned between the hooks and formed from the base of the U-shaped workpiece. The cross arm bracket's hooks are received in the side rail bracket's slots, and the cross arm bracket's locking lip contacts a surface of the side rail bracket, when the bed frame is assembled to prevent substantial wobble in a joint so formed at a bed frame corner.

It has been another objective of this invention to provide an improved bed frame having a unique box spring retainer bracket that is pivotally connected to a frame's side rail for movement between a box spring abutment position in which a retainer leg extends vertically upward from the bed frame's support plane and a storage position in which that one leg overlies the side rail parallel to the frame's support plane, the bracket being preferably connected to the frame's side rail without connectors of any kind. In accord with this objective, the retainer bracket of this invention is in the form of a generally right angular clip having a connector leg and a retainer leg. The connector leg of the clip preferably has an offset section that allows it to extend through a slot in a planar section of the frame's side rail. The end of the connector leg preferably is sized to prevent drawing of that leg completely through said slot, and the end of the retainer leg preferably is provided with a cap to prevent drawing of that leg completely through the slot, all for maintaining the clip in assembly with the side rail at all times. The clip's retainer leg is generally vertical to the frame's support plane when the connector leg is generally parallel to the side rail's planar section for preventing a box spring from sliding off the bed frame. The clip's retainer leg is pivotable into and from storage position where the retainer leg is generally parallel to the frame's support plane simply by pivoting the clip on the slot's axis.

Other objectives and advantages of this invention will be more apparent from the following detailed description taken in conjunction with the drawings in which:

FIG. 1 is a perspective view illustrating a bed frame in accord with the principles of this invention;

FIG. 2 is an enlarged view of area 2—2 encircled in FIG. 1, and illustrating a retainer bracket of this invention in assembly with a frame's side rail;

FIGS. 2A and 2B are views illustrating retainer bracket installation steps, FIG. 2A being the initial step and FIG. 2B being an intermediate step.

FIG. 3 is a cross-sectional view illustrating the retainer bracket in an upright use position with the frame's side rail;

FIG. 4 is a view similar to FIG. 3 but showing the retainer bracket in a collapsed storage position with the frame's side rail;

FIG. 5 is an enlarged view of area 5—5 encircled in FIG. 1, and illustrating a connector assembly of this invention with the frame's cross rail being disconnected from the frame's side rail but poised for connection therewith; and FIG. 6 is a cross-sectional view taken along line 6—6 of FIG. 1.

The bed frame 10 of this invention basically includes two side rails 11, 12 and two cross rails 13, 14, the two cross rails being parallel one to the other and the two side rails being parallel one to the other, and all rails being connected together in frame configuration. Each of the frame's cross rails and side rails is of a right angular cross section, commonly known as angle iron, which defines horizontal top web 11a–14a and downwardly depending side web 11b–14b, when the frame is erected as shown in FIG. 1. A connector assembly 15 in accord with the principles of this invention is partially carried by a side rail 11 or 12 and partially carried by a cross rail 13 or 14 at each corner 16 of the bed frame, that connector assembly providing the means by which the adjacent cross and side rails are interconnected one with the other at that corner of the frame. A leg 17 is also incorporated with each connector assembly 15, the legs of course being for the purpose of upraising the bed frame 10 above floor level during use. Further, the bed frame 10 includes two box spring retainer brackets 18 connected to each side rail 13, 14 one bracket being connected adjacent each end of each cross rail. The retainer brackets 18, when upraised in the use position shown in FIG. 1, prevent a box spring 19 from sliding off the bed frame 10 as shown in FIG. 3.

Each retainer bracket 18 includes a generally right angular shaped clip 22 and a cap 23, see FIGS. 2-4. The clip 22 includes a planar retainer leg 24, and an offset connector leg 25. The connector leg 25 is comprised of a base section 26 connected at one end to the retainer leg 24 and perpendicular thereto, and a latch section 27 spaced from the base section but interconnected by offset section 28 that is angled relative to the parallel planes 26a, 27a defined by the base section and latch section. Note the distance D between the connector leg's base section plane 26a and latch section plane 27a is greater than the thickness T of the side rail's horizontal web 11a or 12a to which the bracket 18 is attached, see FIG. 3. The retainer leg 24 of the clip 22 is planar and is, therefore, perpendicular to both the connector leg's base section 26 and latch section 27. Note particularly that the width W of the clip's retainer leg 24, and the width W of base section 26 and offset section 28 of the clip's connector leg 25 are identical one with the other, see FIG. 2. Note further that these widths W are slightly less than the length L of a retainer slot 29 formed in horizontal top web 11a or 12a of a side rail 11 or 12. However, note further that the clip's latch section 27 is of a width W' significantly greater than the length L of the associated side rail's slot 29, that additional width in effect providing ears 30, 31 on each side of the clip's latch section that prevents the clip's latch section 27 from being drawn through the side rail's slot 29. The retainer bracket's cap 23 is in the nature of a hollow sleeve closed at one end 32 and open at the other end 33, the cap's interior 34 being sized to fit in friction fit relation with the clip's retainer leg 24 over the top portion thereof as shown in FIGS. 3 and 4. Note that the cap 23 has a width W" that is significantly greater than the length L of the associated side rail's slot to prevent the cap from being drawn through that slot.

In use of the retainer bracket 18 with the bed frame's side rail 12, and to assemble the bracket with the side rail, the clip's retainer leg 24 is inserted upwardly through the side rail's slot 29 from beneath that side rail with the cap 23 initially removed from assembly with the clip 22. With the clip 22 in an initial installation position (FIG. 2A) where the base section 26 contacts the under surface 12a' of the side rail's web 12a, the clip is then tilted on slot axis 35 (which is generally parallel to the side rail's axis 36) in a direction that tends to orient the connector leg's offset section 28 vertically (FIG. 2B) while continuing to push the offset section through that slot 29 until ears 30, 31 of the clip's latch section 27 contact the under surface 12a' of the side rail's horizontal web 12a (FIGS. 2 and 3). In this FIG. 2B position, which is the upright use position when a box spring 19 is to be retained on the bed frame 10, the clip's cap 23 is received on the clip's retainer leg 24. When assembled, therefore, the retainer bracket's latch section 27 and the cap 23 tend to retain the clip in assembled relation with the side rail 12 because the width W' of the bracket's latch section 27 and the width W" of the bracket's cap 23 is such that the clip 22 cannot fall through the slot 29. Disassembly of the retainer bracket 18 with the side rail 12 is achieved by reversing the sequence of steps just described.

With the retainer bracket 18 in the upright use position shown in FIG. 3 where the connector leg's base section 26 is seated on top of the side rail's top web 12a, with a box spring corner edge 19a overlying that base section 26, it will be understood the retainer bracket is firmly located in its box spring retaining position. Further, it will be understood that the retainer bracket 18 is maintained in operation assembly with the frame's side rail 12 without the use of fasteners of any kind, all through use of the clip's connector leg 25 structure. The structural features of the retainer bracket 18 also allow the retainer clip 22 to be moved as desired by the user between the retaining or upright use position shown in FIG. 3, and the storage or collapse use position shown in FIG. 4. In the upright FIG. 3 position, and with retainer bracket 18 connected to opposed side rails 11, 12 of the bed frame 10 as shown in FIG. 1, a box spring 19 supported on the bed frame cannot be slid off the bed frame in a direction 37 perpendicular to the side rails 11, 12 as previously mentioned. To collapse the retainer bracket 18 from the upright FIG. 3 position to the storage FIG. 4 position, the clip 22 need merely be pivoted about the slot axis 35 to a position where the clip's retainer leg 24 is parallel to the frame's support plane 38, and the connector leg's base section 26 is positioned vertically above the side rail's slot 29. Thereafter, the retainer clip's connector leg 25 is simply allowed to drop through the side rail's slot 29 until the clip's control leg 24 lies flush on the side rail's top web 12a as shown in FIG. 4. In this storage position, the box spring 19 may be moved or slid laterally off the bed frame in a direction 37 generally perpendicular to the side rail without fear of catching or tearing the upholstery on the box spring's underside.

The connector assembly 15 used at each corner of the bed frame 10 of this invention is particularly illustrated in FIGS. 5 and 6. Each connector assembly 5 includes a cross rail bracket 40 fixed at the end 41 of a cross rail 13 or 14 by rivets 42. Each connector assembly 15 also includes a side rail bracket 43 fixed adjacent to but not at the end 44 of a side rail 11 or 12 by rivets 45. Each side rail bracket 43 also has a leg 17 fixed thereto by rivets 47. The cross rail bracket 40, the side rail bracket 43 and the leg 17 are all formed from sheet metal.

The connector assembly's cross rail bracket 40 is formed from an inverted U-shaped cross section workpiece. The cross rail bracket 40 includes base plate 50 and opposed side walls 51, 52 depending from the base. The bracket 40 is fixed to a cross rail 13 by overlying the bracket's base plate 50 on the cross rail's horizontal top web 13a, thereby causing the bracket's side walls 51, 52 to depend from that top web. The cross rail bracket 40 has a pair of laterally spaced hooks 53, 54 formed on its outer end, i.e., extending beyond end 41 of the cross rail 13, the hooks being cut out from opposed side walls 51, 52 of the inverted U-shaped workpiece. Each of the hooks 53, 54 is downwardly directed by virtue of slit 55 that extends from bottom edge 56 of the bracket 40 toward the base plate 50. The cross rail bracket 40 also includes a friction locking lip 57 formed from the base plate 50 of the inverted U-shaped workpiece. The locking lip 57 depends downwardly from the base plate 50, and is positioned between the bracket's hooks 53, 54. Note longitudinal axis 58 of the cross rail bracket 40 is parallel to longitudinal axis 59 of the cross rail 13, and that lip 57 is generally perpendicular to the bracket's axis 58. This downwardly extending locking lip 57 and the hooks 53, 54 of the cross rail bracket 40 cooperate with the side rail bracket 43 in a manner more particularly described below.

The side rail bracket 43 is formed from an inverted L-shaped cross section workpiece. The side rail bracket 43 includes base plate 60 and side wall 61. The bracket 43 is fixed to a side rail 12 by overlying the side rail's top web 12a on the bracket's base plate 60, the longitudinal axis 62 of that bracket being disposed parallel to the longitudinal axis 36 of the frame's side rail 12. Further, the side rail bracket 43 is connected with side rail 12 so that the bracket and side rail cooperate to define a generally inverted U-shaped configuration, and so that corner 63 of the bracket is spaced inwardly from the inner edge 12a" of that side rail but parallel to the side rail's axis 36. The side rail bracket 43 defines a pair of laterally spaced slots 64, 65 partially formed in the bracket's base plate 60 and partially formed in the bracket's side wall 61, i.e., cut through the bracket's corner 63, the slots being spaced a distance X one from the other substantially equal to the distance X' which the cross rail bracket's hooks 53, 54 are spaced one from the other. The side rail bracket's slots 64, 65 are each provided with a dimple 66, as shown in FIG. 6, directly beneath the bottom ends 67 thereof and in line with the slots. The side rail bracket 43 is also provided with reinforcing ribs 68, 69 in the base plate 60 and side wall 61 thereof that are simply stamped into the bracket for structural rigidity purposes.

In use of the connector assembly, and as illustrated in FIG. 5, adjacent cross 13 and side 12 rails are initially oriented as shown with the cross rail bracket 40 disposed above the side rail bracket 43. Subsequently, the cross rail bracket's hooks 53, 54 are inserted in the side rail bracket's slots 64, 65 until the bottom ends 67 of the slots engages support edges 70 of the hooks as shown in FIG. 6. In this assembled attitude, note that the slots 55 defined between the hooks 53, 54 and side walls 51, 52, respectively, of cross rail bracket 40 is of greater width than the thickness of the side rail bracket's side wall 61. This kind of a dimensional relationship allows the cross rail bracket's hooks 53, 54 to be easily inserted into the final assembled position with the side rail bracket 43 as shown in FIG. 6, but this relationship also normally would permit the cross rail 13 to wobble relative to the side rail 12. However, and also as illustrated in FIG. 6, and importantly relative to this invention, note that the cross rail bracket's downwardly extending locking lip 57 engages the inside surface 71 of the side rail bracket's side wall 61, and note further that the hooks inside edges 72 of cross rail bracket 40 engage with the side rail bracket's dimples 66. This downwardly extending lip 57 and dimple 66 relation with the hooks 53, 54 and side rail bracket's side wall 61 provides a tight friction fit between the cross rail bracket 40 and the side rail bracket 43 which, in effect, establishes a friction lock between the two brackets. This friction lock, of course, provides a relatively tight or wobble free connector assembly 15 between the cross rail 13 and side rail 12 and, thereby, provides a relatively tight bed frame.

Having described in detail the preferred embodiment of my invention, what I desire to claim and protect by Letters Patent is:

1. A bed frame comprising
   a cross rail and a side rail, and
   a connector assembly for connecting said cross rail and said side rail, said connector assembly comprising
   a cross rail bracket fixed to said cross rail and a side rail bracket fixed to said side rail, one of said brackets comprising two hooks and a locking lip extending between said two hooks, and the other of the said brackets comprising two slots in one wall thereof, said slots receiving said hooks in connected relation, and said lip bearing against a face of said slotted bracket so as to provide a substantially wobble free lock between said brackets,
   said cross rail bracket being formed from an inverted generally U-shaped workpiece, said hooks being formed from said bracket's side walls, and said locking lip being formed from said bracket's base plate,
   said side rail bracket being formed from an inverted generally L-shaped workpiece, said slots being disposed in said side rail bracket's side wall and base plate to cut cross the corner thereof, and
   the longitudinal axis of said cross rail bracket being disposed parallel to the longitudinal axis of said cross rail, and the longitudinal axis of said side rail bracket being disposed generally parallel to the longitudinal axis of said side rail.

2. A bed frame as set forth in claim 1, said slotted bracket comprising
   a dimple at the bottom end of each slot, said dimples and said locking lip cooperating with said hooks when said brackets are assembled to provide said substantially wobble free lock between said brackets.

3. A bed frame comprising
   a cross rail and a side rail, and
   a connector assembly for connecting said cross rail and said side rail, said connector assembly comprising
   a cross rail bracket fixed to said cross rail and a side rail bracket fixed to said side rail, one of said brackets comprising two hooks and a locking lip extending between said hooks, and the other of said brackets comprising two slots in one wall thereof, said slots receiving said hook in connected relation so that said lip bears against one face of said slotted bracket, and
   a dimple adjacent the bottom end of each of said slots on an opposite face of said slotted bracket, said hooks bearing against said dimples on said oposite face when said slots and said hooks are received in connected relation, and said dimples and said locking lip cooperating with said hooks when said brackets are assembled to provide a substantially wobble free lock between said brackets.

4. A bed frame as set forth in claim 3,
said cross rail bracket being formed from an inverted generally U-shaped workpiece, said hooks being formed from said bracket's side walls, and said locking lip being formed from said bracket's base plate, and
said side rail bracket being formed from an inverted generally L-shaped workpiece, said slots being disposed in said side rail bracket's side wall and base plate to cut across the corner thereof.

5. A bed frame as set forth in claim 4, the longitudinal axis of said cross rail bracket being disposed parallel to the longitudinal axis of said cross rail, and the longitudinal axis of said side rail bracket being disposed generally parallel to the longitudinal axis of said side rail.

6. A bed frame comprising
a cross rail and a side rail, and
a connector assembly for connecting said cross rail and said side rail, said connector assembly comprising
two downwardly extending hooks on one end of said cross rail, each of said hooks being located in a vertical plane and horizontally spaced one from the other, a downwardly extending locking lip on said cross rail extending between said two hooks, two slots in said side rail, each of said slots being disposed in a vertical wall and attached horizontal wall of said side rail so as to cut across the corner therebetween, each of said slots receiving one of said hooks in connected relation with said lip bearing against a vertical face of said side rail so as to provide a substantially wobble free lock between said bracket.

* * * * *